(12) United States Patent
Benson (10) Patent No.: US 12,436,076 B2
(45) Date of Patent: Oct. 7, 2025

(54) VISCOSITY MEASURING APPARATUS

(71) Applicant: Benson Viscometers Ltd, Dyfed (GB)

(72) Inventor: Charles Bernard Benson, Dyfed (GB)

(73) Assignee: Benson Viscometers Ltd, Dyfed (GB)

( * ) Notice: Subject to any disclaimer, the term of this patent is extended or adjusted under 35 U.S.C. 154(b) by 173 days.

(21) Appl. No.: 18/005,730

(22) PCT Filed: Jul. 19, 2021

(86) PCT No.: PCT/GB2021/051851
§ 371 (c)(1),
(2) Date: Jan. 17, 2023

(87) PCT Pub. No.: WO2022/013578
PCT Pub. Date: Jan. 20, 2022

(65) Prior Publication Data
US 2023/0288306 A1    Sep. 14, 2023

(30) Foreign Application Priority Data
Jul. 17, 2020    (GB) ...................................... 2011074

(51) Int. Cl.
*G01N 11/06*    (2006.01)
(52) U.S. Cl.
CPC .................... *G01N 11/06* (2013.01)
(58) Field of Classification Search
CPC ................................. G01N 11/06; G01N 11/04
USPC .................................... 73/54.07, 54.08, 54.19
See application file for complete search history.

(56) References Cited

U.S. PATENT DOCUMENTS

2003/0182991 A1    10/2003    Spaid et al.

FOREIGN PATENT DOCUMENTS

| CN | 103270403 A | * | 8/2013 | ............. G01N 11/04 |
|---|---|---|---|---|
| EP | 0103172 B1 | * | 7/1987 | |
| EP | 2249141 A1 | | 11/2010 | |
| EP | 2672261 A1 | | 12/2013 | |
| EP | 3447490 A1 | * | 2/2019 | |
| GB | 2255644 A | | 11/1992 | |
| WO | WO-2008097578 A1 | * | 8/2008 | ......... A61B 5/02035 |
| WO | WO-2017106334 A1 | * | 6/2017 | ............. G01N 11/04 |
| WO | 2020/092982 A1 | | 5/2020 | |

\* cited by examiner

*Primary Examiner* — Robert R Raevis
(74) *Attorney, Agent, or Firm* — Simpson & Simpson, PLLC (57) ABSTRACT

A viscosity measuring apparatus comprising a removable viscosity testing module and a viscosity testing apparatus. The removable viscosity testing module comprises a ducting arrangement having a first portion for receiving the fluid and a second portion fluidly connected to the first portion. The viscosity testing apparatus further comprises means for causing the fluid to pass along the ducting arrangement between the first and second portions. The ducting arrangement comprises a first reference point, and a second reference point disposed downstream of the first reference point, the first and second reference points being separated by a fixed, calibrated distance along the ducting arrangement. The apparatus further comprises detecting means for detecting when the fluid reaches at least one of the first and second reference points, and a timer for determining the time taken for the fluid to pass from the first reference point to the second reference point.

18 Claims, 6 Drawing Sheets

VISCOSITY MEASURING APPARATUS

CROSS-REFERENCE TO RELATED APPLICATIONS

This application claims priority pursuant to 35 U.S.C. 119(a) to United Kingdom Application No. 2011074.8, filed Jul. 17, 2020, and International Patent Application No. PCT/GB2021/051851, filed Jul. 19, 2021, which applications are incorporated herein by reference in their entireties.

FIELD OF THE INVENTION

This invention relates to apparatus for use in measuring the viscosity of a fluid.

BACKGROUND

The viscosity of a fluid is its resistance to flow, often perceived as the thickness of a fluid, and viscosity measurements may be used for a range of purposes, including quality control and diagnostics.

In industry, measuring the viscosity of a sample of manufactured fluid can be useful for fluid batch confirmation, to assess the suitability of the fluid for a specific use and performance. For example, if printer ink has a higher than optimum viscosity, it would suggest that the ink contains a greater concentration of pigment than is necessary, leading to a waste of resources; there is also a risk of printer nozzles becoming clogged during operation. Conversely, an ink with a lower than optimum viscosity may give a poor-quality print out. Other examples of fluids where viscosity may be measured for quality control include, but are not limited to, hydrocarbon fluids, food substances, paints, resins, oils and fuels.

In a clinical setting, the viscosity of a biological fluid may be used as an aid in the diagnosis of certain medical conditions. Biological fluids for which viscosity measurement may provide useful diagnostic data include, but are not limited to, blood plasma or serum, whole blood, synovial fluids, vaginal and seminal fluid, urine, and tears.

Measurement of blood plasma viscosity can give an indication of the quantity of plasma proteins within a blood sample, and this may be used to determine whether the blood sample is normal or abnormal. The viscosity of blood plasma is affected by the presence of certain proteins that are produced in normal response to inflammation, or by abnormal 'paraproteins' that are produced in certain diseases.

If a clinician suspects that a patient has an infection or other cause of inflammation, measuring their plasma viscosity may aid in diagnosis. Plasma viscosity gives an indication of conditions such as temporal arteritis or polymyalgia rheumatica, and can also be used to monitor disease progress, especially in rheumatoid arthritis and myeloma. Plasma viscosity measurement may also be used when monitoring patients with COVID-19 to determine whether they are likely to need aggressive intervention, such as the use of ventilators.

The production of paraproteins is associated with some blood cell malignancies, including Waldenströms macroglobulinaemia, and production of high levels of paraproteins may lead to a condition called 'hyperviscosity syndrome'. Measurement of plasma viscosity can therefore be used as an aid in the diagnosis of these conditions.

When a clinician requests analysis of a biological sample, said sample will be sent generally to a hospital pathology laboratory: a process which introduces a delay in receiving results for interpretation and diagnosis. Established laboratory-based tests which measure the viscosity of biological fluids currently involve large, expensive, bench-mounted equipment, which also requires significant training for its operators.

In traditional viscosity measuring equipment, which is used to analyse high volumes of samples, a cleaning step is required between each test to ensure there is no test fluid carry-over or residue contamination which would interfere with subsequent tests; this is particularly important in blood plasma tests which can deposit proteins on test equipment components.

Decontamination of the apparatus is also essential where hazardous substances are concerned. Scrupulous cleaning processes may also take a significant amount of time, may be laborious for the operator, and may themselves involve the use of hazardous and toxic cleaning solutions and substances.

In a fully automated viscosity measuring machine, the cleaning process takes approximately 50 seconds per sample test; for a manual machine, the cleaning time can be as long as 20 minutes.

It is an object of the present invention to provide apparatus for use in accurately measuring the viscosity of a fluid, and which avoids the disadvantages of the prior art.

SUMMARY

According to a first aspect of the present invention there is provided a viscosity measuring apparatus comprising:
  a removable viscosity testing module comprising:
    a ducting arrangement for retaining and conveying a fluid sample to be tested, the ducting arrangement comprising a first portion for receiving the fluid and a second portion fluidly connected to the first portion,
    wherein the ducting arrangement comprises a first reference point and a second reference point disposed downstream of the first reference point, the first and second reference points being separated by a fixed, calibrated distance along the ducting arrangement; and
  a viscosity testing apparatus comprising:
    detecting means for detecting when the fluid reaches at least one of the first and second reference points; and
    a timer for determining the time taken for the fluid to pass from the first reference point to the second reference point;
  wherein the viscosity measuring apparatus further comprises means for causing the fluid to pass along the ducting arrangement between the first portion and the second portion.

The removable viscosity module may comprise at least part of the means for causing the fluid to pass along the ducting arrangement between the first portion and the second portion.

The detecting means may be arranged to detect the fluid at the first and second reference point, and may comprise a first sensor for sensing the fluid at the first reference point, and a second sensor for sensing the fluid at the second reference point. The first sensor and second sensors may be optical sensors, which may be infra-red sensors.

The first portion of the ducting arrangement may comprise a fluid receptacle and the second portion may comprise a capillary tube, in which case the second portion may also comprise a fluid capture reservoir disposed downstream of the capillary tube.

The means for causing the fluid to pass along the ducting arrangement may comprise a syringe.

When the viscosity apparatus comprises a fluid capture reservoir disposed downstream of the capillary tube and the means for causing the fluid to pass along the ducting arrangement comprises a syringe, the fluid capture reservoir may comprise a syringe barrel of the syringe.

The first reference point may be disposed on the first portion or the second portion. The second reference point may be disposed on the second portion.

A viscosity measuring apparatus may comprise a controller communicatively coupled with the detecting means and the timer, the detecting means being arranged to output a signal to the controller in dependence of the detection of a fluid at the first and second reference points, the controller being configured to operate the timer to measure the time taken for the fluid to pass from the first reference point to the second reference point.

The viscosity measuring apparatus may comprise a motor for actuating the means for causing the fluid to pass along the ducting arrangement.

The viscosity measuring apparatus may comprise a separator for separating a fluid sample into its constituent fractions. The separator may be a centrifugal separator and may comprise a spinner disc with a test tube receptacle for a single test tube, in which case the spinner disc may comprise a counterbalance for the single test tube.

According to a second aspect of the invention there is provided a removable viscosity testing module for a viscosity measuring apparatus, the removable module comprising:
 a ducting arrangement for retaining and conveying a fluid sample to be tested, the ducting arrangement comprising a first portion for receiving the fluid and a second portion fluidly connected to the first portion; and
 wherein the ducting arrangement comprises a first reference point and a second reference point disposed downstream of the first reference point, the first and second reference points being separated by a fixed, calibrated distance along the ducting arrangement.

The removable viscosity testing module may comprise means for causing the fluid to pass along the ducting arrangement from the first portion to the second portion.

According to a third aspect of the invention there is provided a viscosity testing apparatus comprising detecting means for detecting when the fluid reaches at least one of a first and second reference point along a ducting arrangement of a removable viscosity testing module, and a timer for determining the time taken for the fluid to pass from the first reference point to the second reference point. The viscosity testing apparatus may further comprise means for causing fluid to pass along the ducting arrangement, and may comprise a separator for separating fluid into its constituent fractions.

The viscosity testing apparatus may also comprise a controller communicatively coupled with the detecting means and the timer, the detecting means being arranged to output a signal to the controller in dependence of the detection of a fluid at the first and second reference points, the controller being configured to operate the timer to measure the time taken for the fluid to pass from the first reference point to the second reference point.

The viscosity testing apparatus may further comprise a housing and a cover lid hingedly coupled to the housing for opening and closing access to an interior of the housing, wherein the cover lid comprises a pad disposed along at least a portion of an interior of the cover lid for shrouding the detecting means when the cover lid is configured to close access to an interior of the housing. The viscosity testing system may comprise a motor for actuating the means for causing fluid to pass along the ducting arrangement.

According to a fourth aspect of the invention there is provided a method of measuring the viscosity of a fluid, the method comprising the steps of:
 causing a fluid sample to pass along a ducting arrangement of a removable viscosity testing module between a first and second portion thereof;
 detecting when the fluid reaches at least one of a first and second reference point of the ducting arrangement, the second reference point being disposed downstream of the first reference point, the first and second reference points being separated by a fixed, calibrated distance along the ducting arrangement; and
 timing the time taken for the fluid to pass from the first reference point to the second reference point.

BRIEF DESCRIPTION

The invention will now be described solely by way of example and with reference to the accompanying drawings in which:

FIG. 2b is a side view of the capillary module card of FIG. 2a.

DETAILED DESCRIPTION

Figure 1:
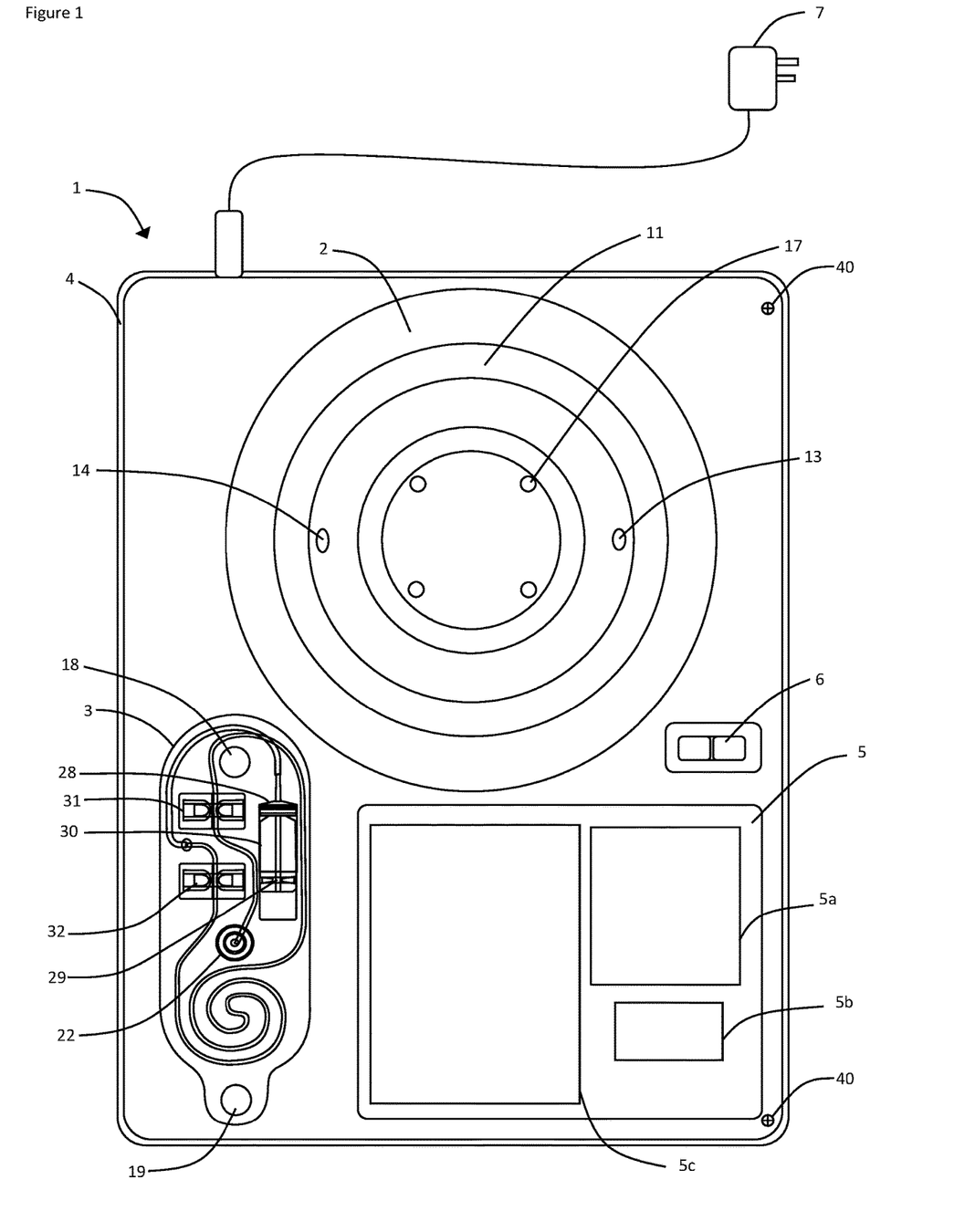
FIG. 1 is a plan view of a viscosity measuring apparatus according to an embodiment of the invention, with the lid removed.

Referring to FIG. 1 of the drawings, there is illustrated a plan view of a viscosity measuring apparatus 1 according to an embodiment of the present invention. The apparatus 1 comprises a removable testing module and a viscosity testing apparatus, the removable testing module being couplable with and removable from the viscosity testing apparatus.

In the embodiment illustrated in FIG. 1, the removable testing module is a capillary module card 3, and the viscosity testing apparatus comprises components including, but not limited to, a separator 2, a housing 4, a user interface 5, a power switch 6, and a plug 7 for connecting the apparatus to a power supply, each of which will be further described below.

Capillary Module Card

Figure 2A:
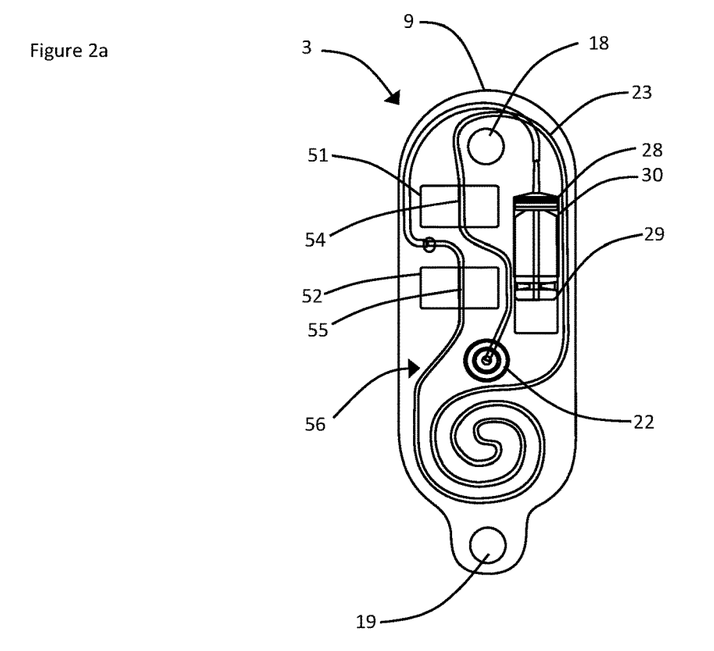
FIG. 2a is a plan view of the capillary module card of FIG. 1.

FIG. 2a illustrates the capillary module card 3, which is a removable viscosity testing module according to a first embodiment of the present invention. The capillary module card 3 is a single-use, disposable component. A new capillary module card is used for each sample that is tested using the viscosity measuring apparatus 1.

The capillary module card 3 comprises a base substrate 9 to which components of the capillary module card 3 are affixed. In this embodiment, the base substrate 9 is planar and comprises a shaped cardboard sheet. Alternatively, the base substrate 9 may comprise any other suitable material, for example, but not limited to a plastics material or metal, or a combination of materials, which may be formed in layers.

The components of the capillary module card 3 are preferably affixed to the base substrate 9 by click-in vacuum-formed cavities and adhesives within a vacuum-formed sheet which is secured to the base substrate 9. Alternatively, the components may be affixed to the base substrate 9 by any suitable means, for example using adhesive; welding the components to the base substrate 9; using a friction fit; using fixing members; or using thin plastics membrane material with an adhesive layer which extends over the components. A combination of such fixing means may be used to affix the various components of the capillary module card 3 to the substrate 9.

The capillary module card 3 comprises at least one locating means, which is provided for locating the capillary module card 3 in the correct position when placed within the housing 4 of the viscosity measuring apparatus 1. In the illustrated embodiment, the locating means comprises two locating apertures 18, 19 (within which corresponding projections 20, 21 disposed within the housing 4 are arranged to locate—see FIG. 3), but the total number of locating apertures and corresponding projections may be greater or fewer. Alternatively, other means of locating may be used such as notches or form fitting of the perimeter of the capillary module card 3 with respect to a heat transfer block 33 (see later) within the housing 4, for example.

Figure 2B:
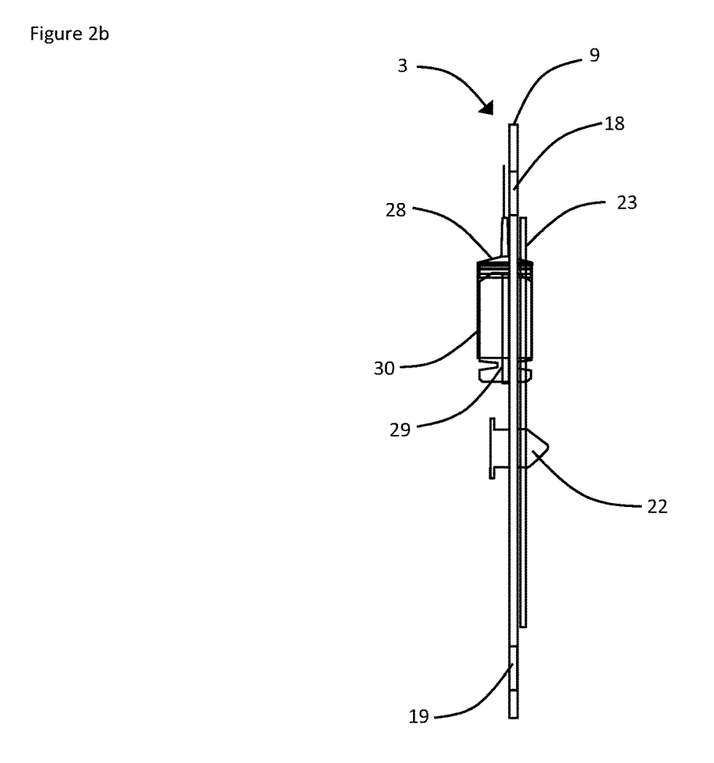

The capillary module card 3 comprises a ducting arrangement 56 for conveying a fluid sample to be tested. The ducting arrangement 56 comprises a first portion, which in the illustrated embodiment comprises a receptacle 22, a second portion, which is a capillary tube 23, and a fluid capture reservoir 30. The sample for testing may be deposited in the receptacle 22, which may be made from any suitable material including, but not limited to, plastics material, glass or metal. As shown in the illustrated embodiment in FIG. 2b, the receptacle comprises a test sample reception cup 22. The reception cup 22 is positioned within an aperture disposed in the base substrate 9 and may be sealed prior to use to avoid contamination of the cup and, therefore, the sample. In use, the seal may be broken to allow the sample to be deposited in the cup and to allow fluid flow from the reception cup and through the capillary tube 23.

The capillary tube 23 is a calibrated tube having a predetermined length and internal diameter. The ducting arrangement further comprises reference points 54, 55 disposed along the length thereof, at a calibrated distance from one another. In the illustrated embodiment, the reference points 54, 55 are disposed along the second portion of the ducting arrangement, namely along the capillary tube 23. The capillary tube 23 may be made from any suitable material, including, but not limited to, plastics material, glass or synthetic industrial tubing. The capillary tube 23 may be transparent, translucent or opaque, and may be any suitable colour, including black, depending on the needs of the testing system used and sensors used. The capillary tube 23 is fluidly coupled at one end to the reception cup 22 and, in the illustrated embodiment, at its other end to a means 28 for causing the test sample fluid to pass along the capillary tube 23 from the reception cup 22.

In the illustrated embodiment, the means for causing fluid to pass along the capillary tube 23 comprises a syringe 28 and a syringe drive mechanism 44, but any suitable means may be used, including, but not limited to, a pump or bellows chamber, or any other vacuum or pressure generating device. The syringe 28 may be manually operated or powered by, for example, an electric motor, linear driver, piezo drive, or any similar motion generator. Alternatively, gravity may be used to produce flow through the capillary tube 23. In such an embodiment, the means for causing fluid to pass along the capillary tube may be, for example, means which causes the capillary tube and/or the other parts of the ducting arrangement to be positioned in or moved into an orientation in which gravity causes the fluid to pass along the capillary tube 23; this may be effected through the positioning or movement of the capillary module card 3. Alternatively, or in addition, there may be means, such as a blocking means, which may prevent the fluid from flowing under the influence of gravity, and which may be moved or removed to cause fluid to pass along the capillary tube 23.

In the illustrated embodiment both the capillary module card 3 and the viscosity testing apparatus comprise means for causing the test sample fluid to pass along the capillary tube (i.e. the syringe 28 and syringe drive mechanism 44, respectively). In other embodiments the means for causing the test sample fluid to pass along the capillary tube may be part of the capillary module card only or may be part of the viscosity testing apparatus only.

As shown in FIG. 2a, the syringe 28 comprises a syringe plunger 29 and a syringe barrel 30, which acts as the fluid capture reservoir. The capillary module card 3 is shown in FIG. 3 in combination with a syringe drive mechanism 44 for controlling the position of the plunger 29 relative to the barrel 30.

Figure 3:
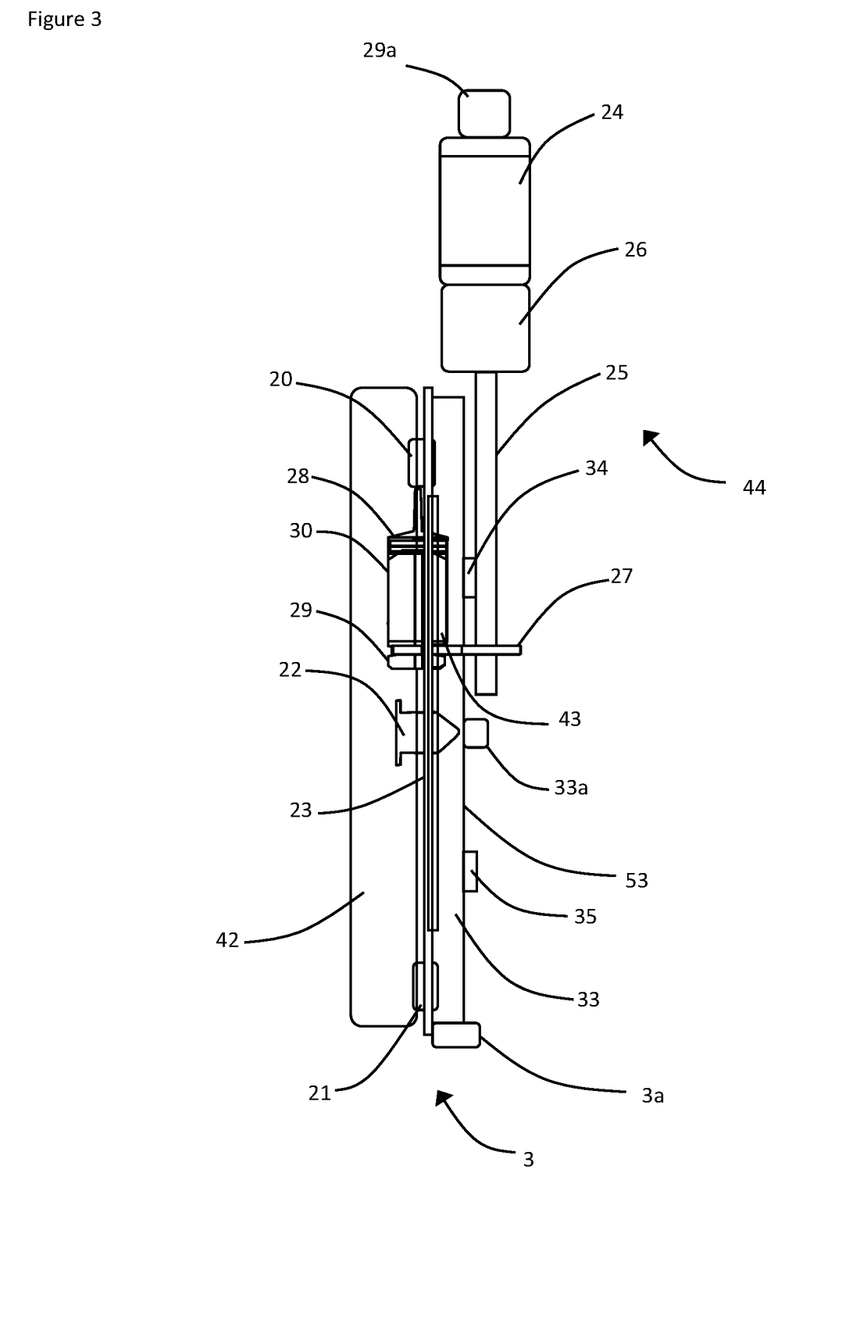
FIG. 3 is a side view of the capillary module card of FIGS. 2a and 2b engaging with other components of the viscosity testing device in situ.

The capillary module card is arranged to allow a sensor 31, 32 of the viscosity measuring apparatus 1, as shown in FIG. 1, to locate along the ducting arrangement 56 at a respective reference point 54, 55, as shown in FIG. 2a, when the capillary module card 3 is received in the housing 4 (and suitably located upon the projections 20, 21 disposed within the housing 4, as shown in FIG. 3). Depending on the sensor arrangement and sensor or detector technology used, the base substrate 9 of the capillary module card 3 may comprise at least one detector or sensor receiving space which may be a sensor receiving aperture, such as apertures 51, 52 illustrated in FIG. 2a. In the illustrated embodiment, a sensor (31, 32, FIG. 1) of the viscosity measuring apparatus 1 is arranged to locate within a respective sensor receiving aperture 51, 52 when the capillary module card 3 is received in the housing 4.

Capillary module card information is displayed on each capillary module card 3. The information may comprise a calibration code which provides the viscosity measuring apparatus 1 with a calibration factor to apply to the viscosity result, which is based on the tested range of the specific capillary module card batch. The information may also comprise an individual serial number and a use by date for the capillary module card 3; this maintains full traceability for each individual capillary module card 3.

When the capillary module card 3 is correctly located within the housing 4, a capillary module card sensor 3a detects its presence and this enables the viscosity testing to commence. In the illustrated embodiment, the capillary module card sensor comprises a microswitch, however sensing may be carried out using an optical sensor, proximity sensor, any electrical contact or switch, or any other suitable sensing method. The capillary module card sensor 3a is communicatively coupled with the controller 5a and this will ensure that the viscosity testing procedure is unable to be initiated until the capillary module card 3 is located within the housing 4.

Syringe Drive Mechanism

A side view of the syringe drive mechanism 44 is illustrated in FIG. 3. The syringe drive mechanism 44 comprises a stepper motor 24, screw drive shaft 25, a gearbox 26 and a claw 27. In the illustrated embodiment, the stepper motor 24 rotates the screw drive shaft 25 via the gearbox 26, which is used to provide the required torque from the stepper motor 24. However, alternative means for activating the means for causing fluid to pass along the capillary tube are envisaged. The claw 27 is mounted around the screw drive shaft 25 so that as the screw drive shaft 25 is rotationally driven by the motor 24, the claw 27 is moved linearly along the drive shaft 25, depending on the direction of rotation of the screw drive shaft 25. As shown in FIG. 3, when the capillary module card 3 is placed in the housing 4, the claw 27 engages with the syringe plunger 29. In this respect, rotational motion of the shaft manifests as a movement of the plunger relative to the barrel to cause the plunger to withdraw from the barrel or move into the barrel, in dependence of the rotational direction of the shaft.

The illustrated embodiment comprises a stepper motor 24 to drive the syringe plunger 29, but any suitable electric motor, linear driver, piezo drive, or any similar motion generator may be used. The motion can be transmitted to the syringe plunger through any suitable means, including but not limited to a drive shaft, lever system or gear system.

While the illustrated embodiment utilises a claw 27 to link the syringe drive mechanism 44 to the syringe plunger 29, any mechanical rapid connection system or similar may be used to quickly and easily connect and disconnect the syringe 28 to the drive mechanism.

Feedback on the motion of either the motor 24 or the syringe plunger 29 may be provided to the controller 5a by way of a position sensor 29a. In the illustrated embodiment this is a rotary encoder providing information on the position of the motor, but this may also be a microswitch, an optical sensor, a proximity sensor or any other suitable sensor positioned on any suitable part of the syringe drive mechanism 44. In embodiments where the means of pulling the fluid through the ducting arrangement is not a syringe and syringe drive mechanism, it is envisaged that similar positional sensing would be carried out by a suitable method for the fluid flow mechanism employed.

In the embodiment where syringe motion is provided by a motor and drive system, the motor may be run by a motor controller (not shown), or may alternatively be run by a motor driver (not shown), a combination of the two, or any other suitable motor driving system. The controller 5a is arranged to instruct the motor controller (not shown) to begin rotation of the motor 24, and will dictate the speed and direction of rotation based on the particular sequence of the device operation in progress.

Fluid Detection Sensors

In the illustrated embodiment, each of the sensors 31, 32 comprises an optical infra-red emitter-detector pair. As mentioned above, in the illustrated embodiment the capillary module card 3 comprises apertures 51, 52 through which the sensors 31, 32 are received, and the sensors 31, 32, are used with a capillary module card 3 comprising a transparent capillary tube 23. When the capillary module card 3 is properly engaged with the sensors 31, 32 in use, the capillary tube 23 is located between the emitter-detector pair of each sensor 31, 32, with the sensors separately corresponding with a respective reference point 54, 55 of the capillary module card 3. As fluid flows through the capillary tube 23, the fluid is arranged to interrupt the signal between an emitter-detector pair. In the illustrated embodiment, the signal interruption at the first sensor 31 is arranged to trigger a timer, and the interruption at the second sensor 32 is arranged to stop the timer. While two sensors are shown, there may be only one sensor or more than two sensors. The time elapsed between the fluid passing between the reference points (or from commencing the withdrawal of the plunger) is used to determine the viscosity of the fluid, as will be described below.

While FIGS. 1 and 2a of the illustrated embodiment show sensors 31, 32 located in apertures 51, 52, other embodiments which allow a sensor or plural sensors to locate correctly along the ducting arrangement 56 are envisaged. For example, the sensors may engage with the reference points 54, 55 from above, in use, rather than projecting from the underside of the capillary module card 3 through apertures 51, 52; in such an embodiment, locating means, such as the engagement of apertures 18, 19 with protrusions 20, 21, allow proper placement of the capillary module card with the apparatus and the correct alignment of the capillary tube reference points with the sensors.

In the illustrated embodiment, the optical sensors 31, 32 are used as part of a fluid flow timing system for detecting the time taken for the test fluid to flow through the capillary tube 23 between measured determination points at which the sensors 31, 32 are located. The time taken is used to calculate and determine the viscosity of the test fluid.

In embodiments where only one sensor is present, the time that elapses between the point at which a vacuum or pressure-generating device (such as the syringe of the illustrated embodiment) is initiated and the point at which the fluid in the capillary tube passes the single sensor may be measured. In other embodiments, the timer may start when the fluid passes the single sensor and may end when the fluid reaches the fluid capture reservoir, for example. Where more than two sensors are present at measured determination points, multiple measurements may be taken along the capillary tube to enable several independent viscosity measurements to be determined for the sample.

However, in the illustrated embodiment, the apparatus comprises a controller 5a communicatively coupled with the detecting means, namely the sensors 31, 32, and a timer 5b. The role of the controller 5a may also be achieved by a combination of a processor (not shown) and other necessary peripherals, or any other suitable means for controlling the operation of the device. The sensors 31, 32 are arranged to output a signal to the controller 5a in dependence of the detection of a fluid at the first and second reference points. The controller in the illustrated example is subsequently arranged to start and stop the timer when the first and second sensors 31, 32 respectively sense the presence of a fluid, so that the time taken for the fluid to pass from the first reference point to the second reference point can be determined.

While the illustrated example utilises optical infra-red sensors, any suitable type of sensor may be used, including proximity sensors, temperature sensors or any other suitable technology to detect the flow of the fluid through the capillary tube.

In embodiments where the means for causing fluid to pass along the capillary tube is, for example, means which causes the capillary tube and/or the other parts of ducting arrangement to be positioned in or moved into an orientation in which gravity causes the fluid to pass along the capillary tube 23, the controller may be arranged to activate a timer when the capillary tube and/or other parts of the ducting arrangement is reconfigured.

Figure 4:
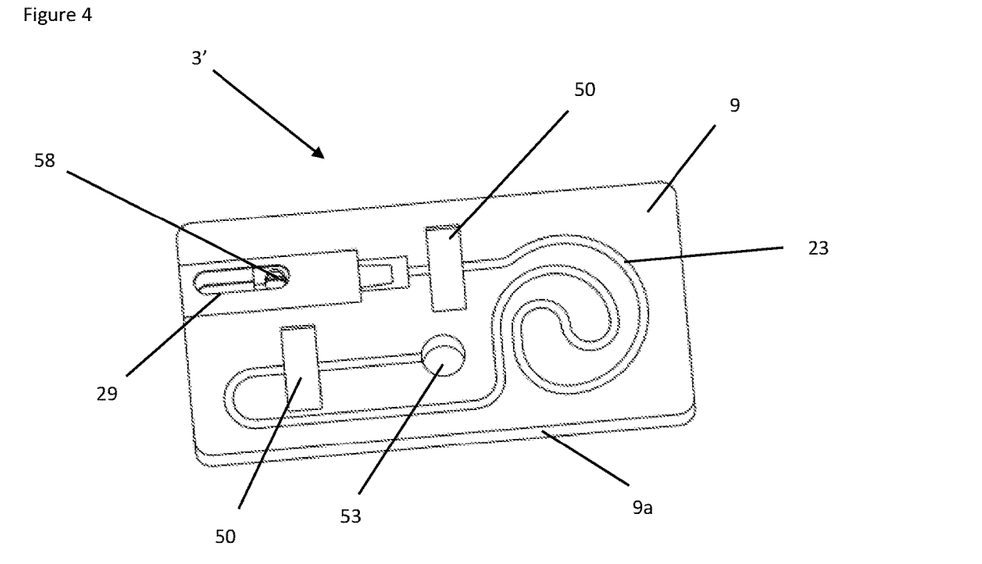
FIG. 4 is a view of the underside of a capillary module card according to an alternative embodiment of the present invention.
Figure 5:
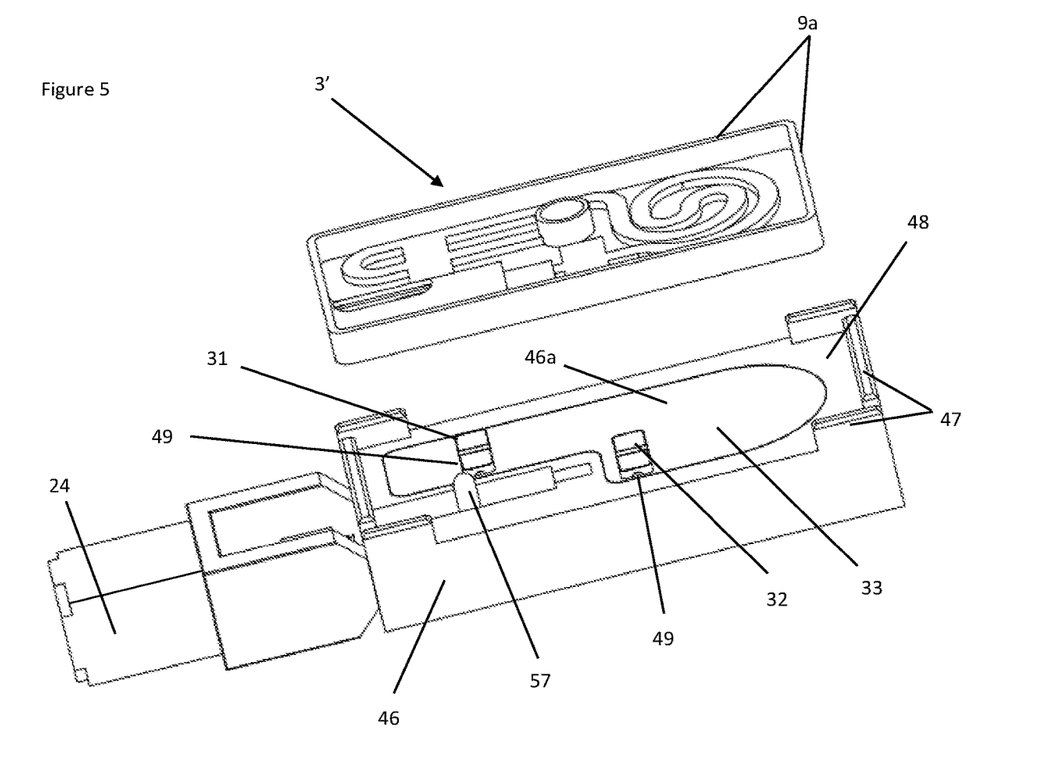
FIG. 5 is an exploded view of the capillary module card illustrated in FIG. 4 alongside the bed.
Figure 6:
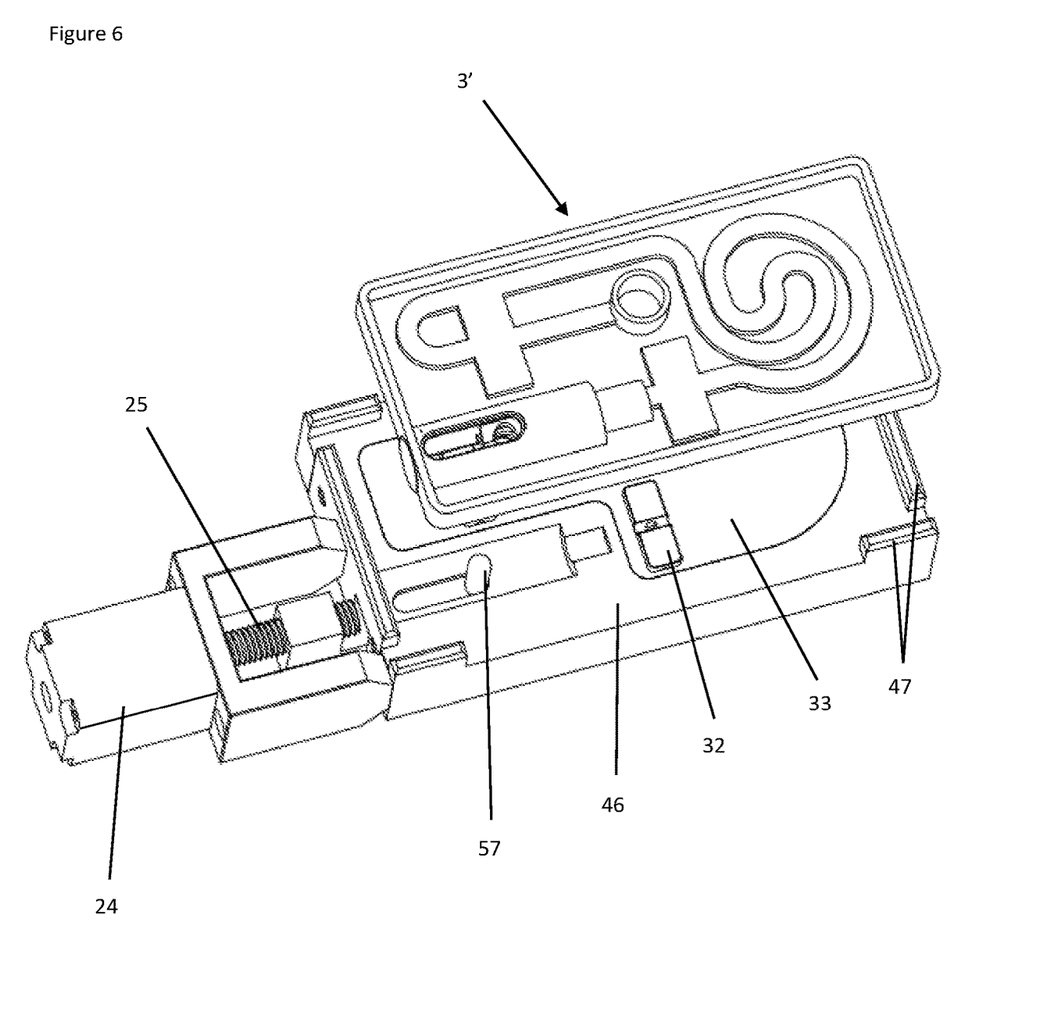
FIG. 6 is an exploded view of the capillary module card and bed illustrated in FIG. 5 from a different view point.

Referring to FIGS. 4 to 6 of the drawings there is illustrated a viscosity testing module 3' according to a second embodiment of the present invention. The testing module 3' of the second embodiment comprises similar components to the testing module 3 of the first embodiment and as such, like features have been referenced with the same numerals. The testing module 3' of the second embodiment however, comprises a base substrate 9 which is formed of a plastics sheet material and comprises an upstanding rim or wall 9a which extends around a periphery thereof. The substrate 9 further comprises a channel 45 which extends along the base 9 and which is open from the underside thereof, for receiving the ducting arrangement 56, namely the capillary tube 23. In addition, the substrate 9 comprises a syringe holding bay 43 formed in the underside thereof for receiving a syringe 28, and an aperture or holding bay 53 for receiving the reception cup 22.

The viscosity testing module 3' is arranged to locate upon a raised bed 46 within the housing 4, which comprises a plurality of barriers 47 disposed along a perimeter thereof. The barriers 47 define a recess 48 upon the bed 46 for receiving and locating the base substrate 9 thereon.

The bed 46 further comprises a heat transfer block 33 (see later), similar to the first embodiment which extends across the bed 46, flush with an upper surface 46a thereof for warming the ducting arrangement 56 and any fluid disposed therein.

To further assist with the locating of the substrate 9 upon the bed 46, the heat transfer block 33 further comprises two apertures 49 disposed therein, through which extend a respective sensor 31, 32. The sensors 31, 32 extend above an upper surface of the bed and are arranged to locate within a receiving cavity 50 formed on the underside of the substrate 9. In this respect, the barriers 47, protruding sensors 31, 32 and sensor receiving cavities 50 serve as locating means for locating the testing module 3' within the housing 4.

The sensors 31, 32 located within each receiving cavity 50 are arranged to locate either side of the ducting arrangement 56 and are arranged to detect the presence of a fluid within the ducting arrangement 56 at the respective location, similar to the testing module 3 of the first embodiment. The receiving cavities 50 thus separately define the first and second reference points 54, 55.

Upon referring to FIGS. 5 and 6 it is also evident that the syringe drive mechanism 44 for the testing module 3' of the second embodiment comprises a pin 57 which engages with a hole 58 in the syringe plunger 29. The pin 57 is coupled with the drive shaft 25 so that the plunger 29 can be moved relative to the barrel 30 and thus vary the volume of the syringe barrel 30 to cause the test sample fluid to move along the capillary tube 23.

Separator

Figure 7:
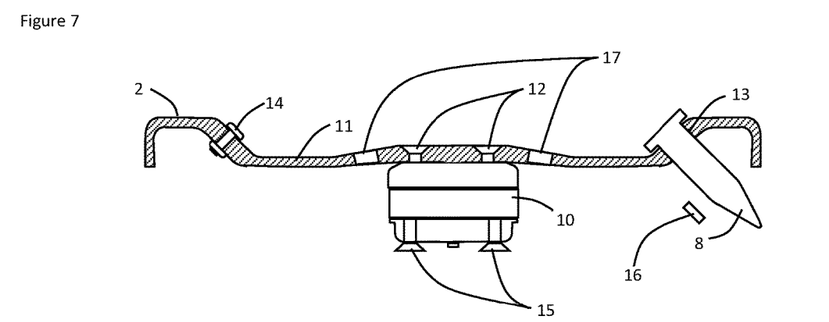
FIG. 7 is a cross-sectional view of the separator of FIG. 1 according to an embodiment of the invention, into which a test tube has been placed.

FIG. 1 shows a plan view of the viscosity measuring apparatus according to an embodiment of the invention, in which the separator 2 is shown, while FIG. 7 shows a cross section of the separator 2 shown in FIG. 1. The separator 2 is a centrifugal separator, which may be used to separate fluids which have various sub-components separable by a variation in their respective mass. For example, blood is frequently subject to a centrifugal separator for the separation and testing of the blood plasma component within hospital pathology laboratories. It is envisaged that other types of separator, such as a filter, may be used.

In the illustrated embodiment, the separator includes a spinner disc 11, a motor unit 10, attachment means 12, 15, a test tube receptacle 13, a balancing weight 14, a proximity sensor 16 and cooling apertures 17.

The spinner disc 11 is attached to the motor unit 10 by a plurality of spinner disc connecting screws 12. Any suitable motor may be used to drive the spinner disc rotationally, including, but not limited to, a DC motor or an AC motor or any other suitable high-speed drive. In the illustrated embodiment, the spinner disc 11 is attached directly to and coaxially with the motor unit 10, but it is envisaged that any suitable connection means for rotationally driving the spinner disc 11 may be used. The separator 2 also comprises means for mounting the spinner disc 11 within the housing 4 of the viscosity measuring apparatus 1. In the illustrated embodiment, the spinner disc 11 is attached within the housing 4 via the motor unit 10, which is attached to the housing 4 by a plurality of housing connecting screws 15. However, the spinner disc 11 may be mounted within the housing 4 using any suitable means that allows for rotational driving of the spinner disc.

Figure 8:
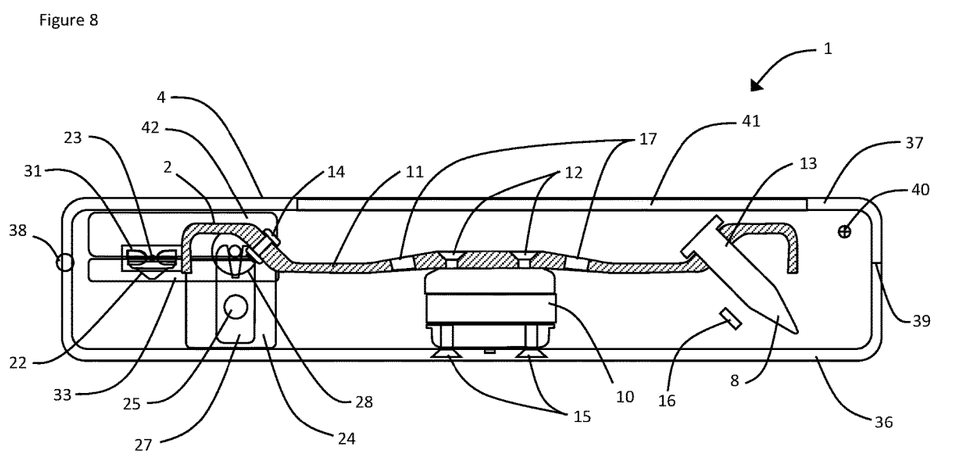
FIG. 8 is a sectional view through the viscosity measuring apparatus of FIG. 1, including a test tube which has been placed within the separator.

The spinner disc 11 comprises a test tube receptacle 13 into which a test tube 8 containing a test sample fluid may be placed. In FIGS. 7 and 8, there is shown a test tube 8 which has been placed within the test tube receptacle 13 of the spinner disc 11. The receptacle is disposed on a region of the disc 11 that is angularly orientated relative to a central portion of the disc 11, so that the test tube 8 is held at an acute angle relative to the rotational axis of the disc 11 to facilitate the separation of the fluid components during rotation of the disc 11.

In the illustrated embodiment, which includes only one test tube receptacle 13, a balancing weight 14 is provided on the spinner disc at a position which is diametrically opposite the test tube receptacle 13. The balancing weight 14 is used to counterbalance the mass of the sample and test tube 8, thereby reducing vibration and ensuring rotational stability of the spinner disc 11. It is envisaged that any suitable means for reducing vibration and ensuring rotational stability of the spinner disc 11 could be used. Alternatively, the separator may comprise multiple test tube receptacles, separated equidistantly around the spinner disc 11, for accommodating separate test tubes, thereby obviating the need for a counterbalance.

The separator 2 further comprises a separator sensor 16 for detecting the presence of a test tube 8 within the test tube receptacle 13. The separator sensor 16 may comprise a proximity sensor, but any sensor suitable for detecting the presence of a test tube 8 may be used. The separator sensor 16 or a separate rotation monitoring method may also be used to determine the rotational speed of the spinner disc 11, such as a rotational sensor, motor and/or motor controller feedback. The separator 2 may be prevented from being accelerated from a very low speed if the separator proximity sensor 16 does not detect the presence of a test tube 8 within the receptable 13.

The rotational speed of the separator 2 may be either fixed or adjustable by the operator to produce an appropriate centrifugal force to separate the fluid fractions from a range of fluid types. For example, separating whole blood for plasma viscosity measuring is carried out at a g-force of 3000 g for 5 minutes or 2000 g for 10 minutes, and this can be replicated by the separator 2 to produce comparable results with conventional laboratory centrifuge separators.

The spinner disc 11 of the illustrated embodiment further comprises cooling apertures 17, which act as air scoops to draw air through the disc 11 (during the rotation thereof) toward the motor unit 10 to cool the motor unit 10 and prevent overheating. It is envisaged that any other suitable cooling means may be used, including cooling blades or a built-in motor cooling fan.

In the illustrated embodiment, the motor unit 10 comprises a built-in motor controller, however a separate motor controller, motor driver, or suitable alternative method may be used to drive the motor unit 10. The required rotational speed of the separator 2 will be communicated to the separator motor unit 10, or separate motor drive unit, by the controller 5a based on the requirements specified by the operator via the user interface 5.

Alternatively, a stand-alone separator may be used to separate a fluid into its constituent parts prior to viscosity measuring.

Housing

In use, the housing 4, as shown in FIGS. 1 and 8, receives the capillary module card 3, 3' of the first or second embodiment. In the illustrated embodiment, the syringe drive mechanism 44, sensors 31, 32 and separator 2 already described are located within the housing. FIG. 1 shows the user interface 5 and power switch 6 mounted on the housing 4.

In the embodiment illustrated in FIG. 8, the housing 4 comprises a base 36 to which a cover lid 37 is hingedly attached by a hinge 38. The cover lid 37 is moveable between a closed position in which the lid 27 shrouds an opening to the housing 4, and an open position in which the lid 37 is pivoted from the housing about the hinge to expose the interior of the housing. When the cover lid 37 is closed, the operator is protected from direct contact with any test fluid in place inside the housing 4 which could be toxic or biologically contaminated.

The cover lid 37 may be locked in a closed position using the lid lock 39. Lid sensors 40 detect whether the lid is in an open or closed configuration. The lid lock 39 is used to ensure operator safety during operation of the separator 2, as well as maintaining security of the internal environment within the housing 4 during viscosity measurement. The lid lock 39 ensures that the cover lid 37 cannot be opened while viscosity measurement is being performed to avoid ambient light or stray infra-red light being detected by the optical sensors 31, 32 and invalidating the viscosity test results. Locking the cover lid 37 closed will also ensure there are no sudden fluctuations in temperature inside the viscosity measuring apparatus 1 during testing (which could otherwise affect the viscosity of the fluid). The lid sensors 40 detect when the lid is open or closed to ensure that either separation or viscosity testing do not commence until the lid is locked closed.

The lid lock 39 may be electronically controlled and may be automatically activated upon closure of the cover lid 37. The lid lock 39 may then be deactivated by communication from the device controller 5a at the appropriate times during device operation, such as upon completion of a viscosity test. The lid lock 39 may also be deactivated by a manual switch which will only be functional when separation and viscosity testing are not in progress. The lid lock 39 also has a manually operated release device to enable the lid to be unlocked in the event of electronic or mechanical failure. The lid lock 39 may comprise one or multiple locking mechanisms. The locking mechanism(s) may comprise solenoids, magnets, or any other suitable electronically controllable locking method. The lid lock 39 may also have a pop-up mechanism (not shown) to confirm that the lid is open and assist the operator in opening the lid to access the internal features of the device. In certain embodiments of the design, such as where the lid lock 39 comprises a solenoid, this pop-up mechanism (not shown) also minimises energy consumption of the lid lock 39.

The cover lid 37 comprises a transparent viewing panel 41 and a pad 42. The pad 42 may be made from a flexible material such as a sponge, to enable pressure to be applied across the capillary module card 3, or may be moulded to fit the geometry of the capillary module card 3 and its components. The pad may also be spring-loaded to apply additional force to secure the capillary module card 3 in place. Alternatively, the capillary module card receiving space within the housing 4 may comprise a separate lid system (not shown) to enable pressure to be applied in strategic locations along the capillary module card 3 when the lid is closed. The pad 42 is further arranged to prevent ambient light from reaching the sensors 31, 32 and thus prevent a false triggering caused by external light sources, when the capillary module card 3 is received in the housing 4 and the cover lid 37 is closed.

In the illustrated embodiment, the firm sponge pad 42 is adhered to the inside surface of the cover lid 37 but it is envisaged that any suitable securing means may be used. It will be understood that other methods may be used to apply pressure to the capillary module card 3 and prevent ambient light from reaching the infra-red sensors 31, 32; for example, the sponge pad 42 may be provided separately of the cover lid 37.

The firm sponge pad 42 also holds the capillary module card 3 in contact with a heat transfer block 33, shown in FIGS. 3 and 5, which is also located inside the housing, thereby enabling conduction of heat from the heat transfer block 33 to the test sample fluid to maintain the test fluid at the correct temperature. The sponge pad 42 further facilitates the location and securing of the syringe 28 of the capillary module card 3 into a syringe holding bay 43, and the reception cup within a reception cup holding bay 53 on the heat transfer block 33, when the capillary module card 3 is received within the housing 4. While the illustrated embodiment comprises a sponge pad, it is envisaged that any other type of pad or other suitable means for applying pressure to the capillary module card 3 and/or preventing light from reaching the sensors may be used.

The heat transfer block 33 of the illustrated embodiment is warmed by two power resistors 34, 35, but this may be a single or any number of power resistors, or alternative warming means may be used. As the viscosity of a fluid changes with temperature, the heat transfer block 33 is used to induce and maintain a target temperature of the test sample fluid so that test results are consistent and reproducible. The heat transfer block 33 is made from a material with a high energy retention and high thermal conductivity, for example, but not limited to, copper, brass or aluminium.

The heat transfer block 33 may be part of a temperature control system which allows the temperature of any suitable part of the system, including the test sample fluid or heat transfer block 33, to be constantly monitored. The operator may be informed of the temperature status of components of the viscosity measuring apparatus 1 on the user interface 5 in real time. The target temperature for clinical testing, for example, may be 37° C.; however, this may be controllable by the operator to enable testing to be carried out at alternative temperatures.

A temperature sensor 33a monitors the temperature of the capillary module card 3, 3' and communicates the temperature measurements to the device controller 5a. Although in the illustrated embodiment the temperature of the capillary module card 3, 3' is monitored, it is envisaged that the temperature of the test sample may be measured either in addition to or as an alternative to the capillary module card temperature sensor 33a. The temperature of the test sample and/or the capillary module card may be determined by any suitable temperature monitoring device such as an infra-red thermometer, resistive thermometer or any other thermometer, and may comprise single or multiple sensors. Alternatively, a time-based method may be used.

The temperature control system may comprise two modes of operation, the first being for significant temperature change, such as increasing the temperature from ambient possibly 20° C. up to the target temperature. With biological fluids, for example, this is likely to be 37° C. The second mode of operation may be a holding mode, allowing the temperature to be maintained within a tolerance of for example ±0.5° C.; this will enable less power to be consumed by the temperature control system during the running of the apparatus; this feature is particularly important for battery powered embodiments of the invention. The two modes of operation for the temperature control system will be controlled by the device controller 5a based on the temperature measurements provided by the temperature sensor 33a, or alternatively based on time in a time-based system. In some embodiments, the viscosity measuring process will only begin when the test sample and capillary module card 3, 3' are at the required temperature. In other embodiments, the operator will be alerted when the required temperature has been reached so that they may initiate the testing process.

In the illustrated example, the user interface 5 is provided on the housing 4, however it is envisaged that the user interface 5 may be positioned on either the base 36 or the cover lid 37. In a further alternative, it is envisaged that the user interface 5 may be disposed remotely from the housing and communicatively coupled therewith via wired or wireless communications link, for example. The user interface 5 may comprise a display screen 5c and user input means, such as a keyboard, keypad or touch screen (5c), for example. The display screen may display operator instructions for setup and continued operation throughout the process which may be in the form of written instructions, pictorial instructions, and/or audio instructions. The display screen may also display, for example, analysis data, environmental data and the results of the viscosity test. If a touch screen is used it may also enable feedback from the operator to the apparatus, for example to acknowledge that certain operations are complete, and negate the need for a keyboard or similar input. The user interface 5 may be used for the input of data such as a calibration code for the capillary module card and relevant patient details. The user interface 5 is communicatively coupled with the controller 5a, which will send and receive data to and from the user interface 5 based on the operation of the device in progress.

The user interface 5, or the viscosity measuring apparatus more generally, may further comprise a communication system capable of transmitting the viscosity test results to a centralised database or relevant organisation. The communication system may utilise, for example, Bluetooth®, WiFi®, or direct wire transmission communication. The information will be received, stored and then transmitted based on instructions from the controller 5a.

Power Supply

FIG. 1 shows a plug 7 for connecting the viscosity measuring apparatus 1 to an electrical power supply, such as a standard mains AC power supply, to power and/or charge the apparatus 1. A standard commercial transformer is used either at a transformer plug, an inline cable transformer, or an internal transformer to convert the mains power to 12V DC. Alternatively, a suitable plug may be supplied which allows the apparatus 1 to be electrically connected to a 12V outlet in a motor vehicle or similar. In a further alternative, the apparatus may be powered by a battery arrangement (not shown), which may be rechargeable and/or replaceable. The battery may be internally or externally mounted or provided as an external carry-and-connect battery. The apparatus may also comprise a solar panel to permit a solar charging of a battery, thereby allowing the apparatus 1 to be used in locations where there is not otherwise a reliable electrical power supply.

Example Method of Using the Viscosity Measuring Apparatus

An example of using the viscosity measuring apparatus 1 according to the illustrated embodiment to test blood plasma viscosity will now be described.

Firstly, the viscosity apparatus 1 is connected to a power supply, such as an AC power supply using the plug 7, and the apparatus is turned on using the power switch 6.

Before the capillary module card 3, 3' is inserted into the housing 4, the operator inputs the information displayed on the capillary module card 3 using the user interface 5. The appropriate test conditions, including the operating temperature, may also be set using the user interface 5, and may be entered following a prompt on the user interface 5.

With specific reference to the capillary card module 3 of the first embodiment, (although the skilled reader will recognise that the following description is also applicable to the capillary card module 3' of the second embodiment) when the cover lid 27 is open, the operator places the capillary module card 3 into the housing 4 in the correct position as dictated by the engagement of the locating apertures 18, 19 with the projections 21, 22 of the housing 4, and with the syringe plunger 29 of the capillary module card 3 engaging with the claw 27 of the syringe drive mechanism 44. This positioning ensures that the capillary tube 23 is properly located between each of the emitter-detector pairs forming the sensors 31, 32, which also become located within the sensor receiving apertures 51, 52.

The capillary module card sensor 3a will communicate to the controller 5a that the capillary module card 3 has been inserted, and this may enable warming of the heat transfer block 33 to begin by applying a voltage output to the power resistors 34, 35. Alternatively, warming of the heat transfer block 33 may be automatically activated upon powering on of the device.

While the heat transfer block 33 and the capillary module card 3 are being warmed to the specified temperature, namely 37° C. for clinical testing of blood plasma, the blood sample can be separated using the device separator 2.

The operator places a sample of the fluid under test, such as a blood sample collected in a tube containing Ethylenediamine tetraacetic acid (EDTA) to prevent coagulation, in the test tube 8. The operator subsequently inserts the test tube 8 into the test tube receptacle 13 of the separator 2, confirms the placement of the test tube 8 within the receptacle 13 using the user interface 5, and instructs the apparatus 1 to begin the separation process. The operator then closes the cover lid 37 or will be instructed to do so by the user interface 5. The separator 2 will not start until the lid sensors 40 detect that the cover lid 37 is closed. The separator will then begin to spin at a reduced speed until the separator detector 16 has confirmed the presence of a test tube 8 in the receptacle 13. Once detected, the separator 2 will continue to spin at the required speed for separation of blood plasma.

When the test tube 8 is in place and the cover lid 37 is closed, the lid lock 39 is activated to ensure that the cover lid 37 cannot be opened while separation is in progress. The lid lock 39 may be manually operated or automatically activated. The separator motor unit 10 is then activated and spins at the required speed for the required time frame, as selected by the operator.

When the appropriate time has elapsed and the blood sample has been separated into its constituent parts, the separator 2 will stop rotating. The lid lock 39 will be released, and the cover lid 37 is opened to allow the operator to access the test tube 8 containing the separated test sample fluid. The blood plasma is then ready to be removed from the test tube 8. (If the apparatus does not comprise a separator or the test sample does not require separation, the above steps relating to the separator may be omitted.)

Any seal on the reception cup 22 must be broken or opened by the operator to allow the transfer of an appropriate quantity of the test fluid, namely blood plasma in this example, to the reception cup 22 of the capillary module card 3. The fluid may be transferred using any known means, such as a pipette, syringe or similar, and may be transferred into the reception cup 22 immediately before testing or at some other time before testing.

The cover lid 37 is then closed and locked using the lid lock 39, and the firm sponge pad 42 applies pressure to the capillary module card 3 to secure it in position, block ambient light and allow the heat transfer block 33 to apply any required temperature control to the sample. The cover lid 37 remains locked closed throughout the viscosity measuring process.

When the appropriate test conditions have been set and any data input steps are complete, the viscosity measuring process itself can be activated by the operator via the user interface 5; the process begins when the test sample and/or capillary module card 3 reach the required temperature. In embodiments where the user interface 5 is positioned on the interior/base 36 of the housing 4, a start button may be located on the cover lid 37 to enable the process to be manually initiated upon closure of the cover lid 37. The stepper motor 24 rotates the screw drive shaft 25 to cause the syringe claw 27, and correspondingly the syringe plunger 29, to move relative to the barrel 30 and thus increase the variable volume of the syringe barrel 30. This creates suction which draws the test sample fluid along the capillary tube 23.

When the fluid moving through the capillary tube 23 reaches the first sensor 31, it interrupts the signal between the emitter and detector, which triggers the start of a timer system. When the fluid reaches the second sensor 32, the signal between the respective emitter-detector pair is interrupted, and the time between the interruption at the first sensor 31 and the second sensor 32 is measured. The run time taken for the fluid to travel between the two sensors 31, 32 can be used to calculate and determine the test fluid viscosity, and the test results may be displayed on the user interface 5. The stepper motor 24 continues to operate the syringe plunger 29 until the syringe barrel 30 reaches maximum volume so that the maximum possible sample volume has entered the syringe barrel 30, which becomes the fluid capture reservoir. Once the test has been completed and the results reported, and the syringe plunger 29 has completed its fluid-drawing motion, the capillary module card 3 can be removed from the housing 4 for disposal.

A major advantage of the viscosity measuring apparatus 1 is that the capillary module card 3 is a single-use unit which may be disposed of and destroyed easily and safely after use. When the capillary module card 3 is received in the housing 4, the test sample fluid does not come into direct contact with any components that are not part of the disposable capillary module card 3, so there is no contamination of those components. This means that when the capillary module card 3 is removed from the housing 4 and disposed of, no in-depth cleaning or decontamination of the said components of the viscosity measuring apparatus 1 is required. This means that the operator need not carry or be exposed to harmful cleaning agents which may be required to clean conventional viscosity measuring apparatus. The operator is also not exposed to the potentially hazardous test sample fluid once the sample has been drawn into the syringe barrel 30. Moreover, since minimal cleaning is required, the testing of further samples can commence immediately.

Where the apparatus includes a separator, all the machinery required to conduct the viscosity test is contained in one unit. Most commercial separators comprise multiple receptacles so that multiple samples can be processed simultaneously. The separator of the present invention may be designed to process only one test sample at a time, as shown in the illustrated embodiment. The disclosed separator provides a counterbalance to allow the separator to work effectively with a single test sample.

While the viscosity measuring apparatus has been described above in a clinical context, it is suitable for both clinical and non-clinical applications where a laboratory viscometer is not available, but an accurate and rapid fluid viscosity result is required.

For clinical tests, the viscosity apparatus 1 may be used in GP surgeries, clinics, specialist treatment centres, care homes for the elderly, prisons, and cruise ships. It may also be used when clinicians, doctors and nurses or care workers need to travel to the patient as a point of care instrument.

The viscosity measuring apparatus 1 is small and portable, and able to generate the viscosity results for a test sample within minutes; it allows tests to be carried out locally and negates the need for the test samples to be sent to a hospital pathology laboratory, thereby avoiding the associated delays in results and implementation of treatment.

The viscosity measuring apparatus 1 can be used in hospital Accident & Emergency facilities or minor injuries departments, enabling a faster diagnosis of conditions such as temporal arteritis, which can cause blindness if not treated very rapidly. In addition, the viscosity measuring apparatus would enable hospitals without pathology laboratories to access plasma viscosity testing rapidly without the need to send samples away, improving the time within which a diagnosis can be made and treatment can begin.

The invention claimed is:

1. A viscosity measuring apparatus comprising:
   a viscosity testing module that is removable from a viscosity testing apparatus, the module comprising:
      a ducting arrangement for retaining and conveying a fluid sample to be tested, the ducting arrangement comprising a first portion for receiving the fluid and a second portion fluidly connected to the first portion, wherein the ducting arrangement comprises a first reference point and a second reference point disposed downstream of the first reference point, the first and second reference points being separated by a fixed, calibrated distance along the ducting arrangement; and the viscosity testing apparatus comprising:
  detecting means for detecting when the fluid reaches at least one of the first and second reference points; and
  a timer for determining the time taken for the fluid to pass from the first reference point to the second reference point;
wherein the viscosity measuring apparatus further comprises means for causing the fluid to pass along the ducting arrangement between the first portion and the second portion, and wherein the viscosity testing module comprises at least part of said means for causing the fluid to pass along the ducting arrangement between the first portion and the second portion.

2. The viscosity measuring apparatus as claimed in claim 1, wherein the detecting means is arranged to detect the fluid at the first reference point and the second reference point, wherein the detecting means comprises a first sensor for sensing the fluid at the first reference point, and a second sensor for sensing the fluid at the second reference point, wherein the first sensor and second sensors optionally are optical sensors.

3. The viscosity measuring apparatus as claimed in claim 1, wherein the first portion comprises a fluid receptacle and the second portion comprises a capillary tube.

4. The viscosity measuring apparatus as claimed in claim 3, wherein the second portion comprises a fluid capture reservoir disposed downstream of the capillary tube.

5. The viscosity measuring apparatus as claimed in claim 1, wherein the means for causing the fluid to pass along the ducting arrangement comprises a syringe.

6. The viscosity measuring apparatus as claimed in claim 5, wherein the second portion comprises a fluid capture reservoir disposed downstream of the capillary tube, and the fluid capture reservoir comprises a syringe barrel of the syringe.

7. The viscosity measuring apparatus as claimed in claim 1, wherein the first reference point is disposed on the first portion.

8. The viscosity measuring apparatus as claimed in claim 1, wherein the second reference point is disposed on the second portion.

9. The viscosity measuring apparatus as claimed in claim 8, wherein the first reference point is disposed on the second portion.

10. The viscosity measuring apparatus as claimed in claim 1, further comprising a controller communicatively coupled with the detecting means and the timer, the detecting means being arranged to output a signal to the controller in dependence of the detection of a fluid at the first and second reference points, the controller being configured to operate the timer to measure the time taken for the fluid to pass from the first reference point to the second reference point.

11. The viscosity measuring apparatus as claimed in claim 1, further comprising a motor for actuating the means for causing the fluid to pass along the ducting arrangement.

12. A viscosity measuring system, comprising the viscosity measuring apparatus as claimed in claim 1 and further comprising a separator for separating a fluid sample into its constituent fractions, wherein the separator is a centrifugal separator comprising a spinner disc with a test tube receptacle for a single test tube, wherein the spinner disc comprises a counterbalance for the single test tube.

13. A viscosity testing apparatus for the viscosity measuring apparatus according to claim 1, the viscosity testing apparatus further comprising a separator for separating fluid into its constituent fractions.

14. The viscosity testing apparatus as claimed in claim 13, further comprising a controller communicatively coupled with the detecting means and the timer, the detecting means being arranged to output a signal to the controller in dependence of the detection of a fluid at the first and second reference points, the controller being configured to operate the timer to measure the time taken for the fluid to pass from the first reference point to the second reference point.

15. The viscosity testing apparatus as claimed in claim 13, further comprising a housing, and a cover lid hingedly coupled to the housing for opening and closing access to an interior of the housing, wherein the cover lid comprises a pad disposed along at least a portion of an interior of the cover lid for shrouding the detecting means when the cover lid is configured to close access to an interior of the housing.

16. The viscosity testing apparatus as claimed in claim 13, further comprising a motor for actuating the means for causing fluid to pass along the ducting arrangement.

17. The viscosity testing apparatus as claimed in claim 13 comprising means for causing fluid to pass along the ducting arrangement.

18. A method of measuring the viscosity of a fluid using the viscosity measuring apparatus according to claim 1, the method comprising the steps of:
  causing a fluid sample to pass along the ducting arrangement of the viscosity testing module between the first and second portion thereof;
  detecting when the fluid reaches at least one of the first and second reference points of the ducting arrangement, the second reference point being disposed downstream of the first reference point, the first and second reference points being separated by a fixed, calibrated distance along the ducting arrangement; and
  timing the time taken for the fluid to pass from the first reference point to the second reference point.

* * * * *